(12) United States Patent
Peterson et al.

(10) Patent No.: US 8,477,620 B2
(45) Date of Patent: *Jul. 2, 2013

(54) SYSTEM AND METHOD TO PROVIDE MULTIPLE PRIVATE NETWORKS USING PBB

(75) Inventors: C. Robert Peterson, Idaho Falls, ID (US); Thomas F. Herbert, Richmond, VA (US)

(73) Assignee: Entry Point, LLC, Idaho Fall, ID (US)

( * ) Notice: Subject to any disclaimer, the term of this patent is extended or adjusted under 35 U.S.C. 154(b) by 109 days.

This patent is subject to a terminal disclaimer.

(21) Appl. No.: 13/111,430

(22) Filed: May 19, 2011

(65) Prior Publication Data

US 2011/0216779 A1    Sep. 8, 2011

Related U.S. Application Data

(63) Continuation-in-part of application No. 12/915,591, filed on Oct. 29, 2010, which is a continuation-in-part of application No. 12/181,257, filed on Jul. 28, 2008, now Pat. No. 7,843,944, which is a continuation-in-part of application No. 11/616,805, filed on Dec. 27, 2006, now abandoned.

(60) Provisional application No. 60/952,837, filed on Jul. 30, 2007.

(51) Int. Cl.
*G01R 31/08* (2006.01)

(52) U.S. Cl.
USPC .......................... 370/235; 370/392; 370/400

(58) Field of Classification Search
CPC ............. H04L 12/4625; H04L 12/4662; H04L 12/4633; H04L 12/4658; H04L 12/462
USPC .............................. 370/389, 392, 395.53, 401
See application file for complete search history.

(56) References Cited

U.S. PATENT DOCUMENTS

| | | |
|---|---|---|
| 6,381,216 B1 | 4/2002 | Prasad |
| 6,526,046 B1 | 2/2003 | Carew |
| 6,760,775 B1 | 7/2004 | Anerousis et al. |
| 6,775,284 B1 | 8/2004 | Calvignac et al. |

(Continued)

FOREIGN PATENT DOCUMENTS

EP    1404081    3/2004

OTHER PUBLICATIONS

Office Action dated Aug. 31, 2012 from U.S. Appl. No. 12/915,591, filed Oct. 29, 2010 (6 pages).

(Continued)

*Primary Examiner* — Jung Park
(74) *Attorney, Agent, or Firm* — Workman Nydegger (57) ABSTRACT

A system and method are supplied to provide multiple private networks. The system can include a Provider Backbone Bridge (PBB) interface or interfaces configured to receive a plurality of data stream types each associated with an Instance Service Identifier (I-SID) from a Metropolitan Area Network (MAN) or public carrier Ethernet. A plurality of local area network (LAN) ports can be configured to communicate data to a plurality of LANs. A switching process is provided between the PBB interface and the LAN ports. The switching process can be configured to bind individual data stream types from subdivided data streams each represented by an I-SID to each of the respective LAN ports. In addition, the switching process can communicate packets between the PBB interface and the bound LAN ports.

27 Claims, 7 Drawing Sheets

U.S. PATENT DOCUMENTS

| | | | |
|---|---|---|---|
| 6,785,279 | B1 | 8/2004 | Crooks |
| 6,798,751 | B1 | 9/2004 | Voit et al. |
| 6,891,825 | B1 | 5/2005 | O'Dell et al. |
| 6,898,276 | B1 | 5/2005 | Millet et al. |
| 6,904,054 | B1 | 6/2005 | Baum et al. |
| 7,002,995 | B2 | 2/2006 | Chow et al. |
| 7,009,982 | B2 | 3/2006 | Scott et al. |
| 7,068,654 | B1 | 6/2006 | Joseph et al. |
| 7,113,512 | B1 | 9/2006 | Holmgren et al. |
| 7,120,150 | B2 | 10/2006 | Chase et al. |
| 7,136,386 | B2 | 11/2006 | Allen et al. |
| 7,184,440 | B1 | 2/2007 | Sterne et al. |
| 7,292,581 | B2 | 11/2007 | Finn |
| 7,724,745 | B1* | 5/2010 | Elangovan et al. ........... 370/392 |
| 7,843,944 | B2 | 11/2010 | Peterson et al. |
| 2001/0052012 | A1 | 12/2001 | Rinne et al. |
| 2003/0189898 | A1 | 10/2003 | Frick et al. |
| 2004/0037260 | A1 | 2/2004 | Kakemizu et al. |
| 2004/0037296 | A1 | 2/2004 | Kim et al. |
| 2004/0114570 | A1 | 6/2004 | Vikberg et al. |
| 2004/0165592 | A1 | 8/2004 | Chen et al. |
| 2004/0165600 | A1 | 8/2004 | Lee |
| 2004/0218614 | A1 | 11/2004 | Yokomitsu et al. |
| 2005/0018605 | A1 | 1/2005 | Foote et al. |
| 2005/0120089 | A1 | 6/2005 | Kang et al. |
| 2005/0169279 | A1 | 8/2005 | Magd et al. |
| 2006/0013142 | A1 | 1/2006 | Hongal et al. |
| 2006/0072589 | A1 | 4/2006 | Mandavilli et al. |
| 2006/0098632 | A1 | 5/2006 | Johnson |
| 2006/0239273 | A1 | 10/2006 | Buckman et al. |
| 2006/0248229 | A1 | 11/2006 | Saunderson et al. |
| 2006/0251074 | A1 | 11/2006 | Solomon |
| 2006/0291473 | A1 | 12/2006 | Chase et al. |
| 2007/0058558 | A1 | 3/2007 | Cheung et al. |
| 2008/0019385 | A1* | 1/2008 | Sultan et al. ................. 370/401 |
| 2008/0144632 | A1 | 6/2008 | Rabie et al. |
| 2008/0159298 | A1 | 7/2008 | Peterson et al. |
| 2008/0291914 | A1* | 11/2008 | Bi ................................. 370/390 |
| 2008/0310424 | A1 | 12/2008 | Peterson et al. |
| 2009/0028162 | A1 | 1/2009 | Hu |
| 2009/0168783 | A1* | 7/2009 | Mohan et al. .............. 370/395.5 |
| 2011/0216772 | A1* | 9/2011 | Mohan et al. ................. 370/392 |

OTHER PUBLICATIONS

"802.1ah Ethernet Pseudowire"; Luca Martini, Ali Sajassi, IETF; Internet Draft, Network Working Group; Jul. 2008; http://tools.ietf.org/id/draft-martini-pwe3-802.1ah-pw-03.txt.

IEEE Specification 802.1ah; Institute of Electrical and Electrical Engineers; (Based on information and belief, available at least as early as Oct. 2010 http://www.ieee802.org/1/pages/802.1ah.html.

Erickson, IEEE Specification 802.1qay; Institute of Electrical and Electrical Engineers; (Based on information and belief, available at least as early as Oct. 2010).

"Issue 39—Topic on Mobile Backhaul"; Pu Yen; "Huawei Communicate"; Issue 39, 2008; Huawei Corporation; http://www-cnc.huawei.com/publications/view.do?id=2990&cid=5409&pid=61.

Mac-in-mac frame format and 802.1ah draft 3.4; Rbridge; Postel.org; Information Sciences InstituteUniversity of Southern California Viterbi School of Engineering; Apr. 2007; http://www.postel.org/pipermail/rbridge/2007-April/002057.html.

PBB/PBB-TE Layer Stack—Maarten Vissers, IEEE Sep. 2007; http://www.ieee802.org/1/files/public/docs2007/ay-vissers-pbb+pbbte-layer-stack-0907.pdf.

PBB/PBB-TE Basics—Maarten Vissers, IEEE Jan. 2008.

Provider Backbone,Transport Nortel Technology Brief, Nortel Maidenhead Office Park, Westacott Way, Maidenhead, Berkshire, UK; 2006; http://www.nortel.com/solutions/collateral/nn114980.pdf.

Provider Backbone Transport, Nortel Technology Brief, Achieving true carrier-grade Ethernet, Nortel Maidenhead Office Park, Westacott Way, Maidenhead, Berkshire, UK; 2006.

"The Right Transport Solution for Carrier Ethernet Services," Brian Pratt; Connected Planet; Jul. 2007; http://connectedplanetonline.com/ethernet/technology/transport_ethernet_services_060907/.

Tzung-Pao Lin et al., "Interconnections of Large-Scale LANs via a Two-Stage Switching Hub for Multimedia Applications," Local Computer Networks, 1994. Proceedings, 19th Conference, Oct. 2-5, 1994, pp. 249-256.

Wikipedia, Provider Backbone Bridge Traffic Engineering, (Based on information and belief, available at least as early as Oct. 2010) http://en.wikipedia.org/wiki/Provider_Backbone_Bridge_Traffic_Engineering.

Wikipedia, Ethernet, (Based on information and belief, available at least as early as Oct. 2010) http://en.wikipedia.org/wiki/Ethernet.

U.S. Appl. No. 11/616,805, Apr. 2, 2009, Office Action.

U.S. Appl. No. 11/616,805, Dec. 11, 2009, Office Action.

U.S. Appl. No. 11/616,805, Mar. 31, 2010, Office Action.

U.S. Appl. No. 12/181,257, Dec. 21, 2009, Office Action.

U.S. Appl. No. 12/181,257, Jul. 23, 2010, Notice of Allowance.

Notice of Allowance dated Dec. 19, 2012 from U.S. Appl. No. 12/915,591, filed Oct. 29, 2010 (5 pages).

* cited by examiner

Legend for Figure 4

| | | | |
|---|---|---|---|
| Add/Drop Mux | | Public Switch Telephone Network | |
| Label Switch Router | | | |
| | | Cable Head End | |
| Router | | | |
| | | Twisted Pair Copper Cat5 or 26 gauge telco | |
| Provider Edge | | | |
| DWDM | | Bridge | |
| DWDM | | | |
| | | Wireless Access Point | |
| Single Mode Fiber | | | |
| | | Utility Management Module | |
| Fiber | | | |
| PBX/T1 and above | | Data Network | |
| POTS < T1 | | TV NTSC/MPEG | |
| Mobile User (PDA, etc) | | | |
| Express power Module | | | |

SYSTEM AND METHOD TO PROVIDE MULTIPLE PRIVATE NETWORKS USING PBB

CROSS-REFERENCE TO RELATED APPLICATIONS

This application is a Continuation-in-Part of U.S. patent application Ser. No. 12/915,591, filed Oct. 29, 2010, which is a Continuation-in-Part of U.S. patent application Ser. No. 12/181,257, filed Jul. 28, 2008 and issued on Nov. 30, 2010 as U.S. Pat. No. 7,843,944, which claims the priority of U.S. Provisional Patent Application No. 60/952,837, filed Jul. 30, 2007. U.S. patent application Ser. No. 12/181,257 is also a Continuation-in-Part of U.S. patent application Ser. No. 11/616,805, filed Dec. 27, 2006 now abandoned. All of the above identified patent applications, including now issued U.S. Pat. No. 7,843,944, are hereby incorporated herein by reference in their entirety.

BACKGROUND

Today, connectivity is essential for every business and every human endeavor. As a result, business requirements are fueling further evolution and innovation in the network. Triple play services including simultaneous voice, data and video are provided in legacy networks using carrier Ethernet and Metropolitan Ethernet. Although these networks have many advantages over earlier ATM, SONET and SDH networks, they have introduced some problems.

There has been a massive explosion in the number of customers for services on these networks, increasing the number of simultaneous connections. Simultaneously, Ethernet has become the media of choice for the core and edges of the carrier's networks. Although excellent, simple and easy to deploy, Ethernet has a few inherent problems. One is the scalability of deploying many customer connections over the carrier public network and the other is security. Earlier deployments of core infrastructure have used VLAN tagging and Q-in-Q. Each of these methods solves some problems but still retains problems inherent to Ethernet networks including vulnerabilities to certain attacks and configuration mistakes including ARP or adjacency table poisoning; malicious or intentional Denial of Service by introducing duplicate Media Access Control (MAC) addresses or other mechanisms.

Consequently, delivering revenue-generating applications over converged, Ethernet-based infrastructures creates a desire for a more secure access network.

BRIEF SUMMARY

A system and method are supplied to provide multiple private networks. The system can include a Provider Backbone Bridge (PBB) interface or interfaces configured to receive a plurality of data stream types each associated with an Instance Service Identifier (I-SID) from a Metropolitan Area Network (MAN) or public carrier Ethernet. A plurality of local area network (LAN) ports can be configured to communicate data to a plurality of LANs. A switching process is provided between the PBB interface and the LAN ports. The switching process can be configured to bind individual data stream types from subdivided data streams each represented by an I-SID to each of the respective LAN ports. In addition, the switching process can communicate packets between the PBB interface and the bound LAN ports.

This type of network can be engineered to deliver carrier-class service but the network must be optimized to associate traffic streams with the respective applications and process each traffic stream according to a predefined Service Level Agreement (SLA). Customers desire such optimized networks to provide the same and preferably better service quality than the legacy infrastructure. To ensure that each service receives the appropriate QoS treatment and meets SLA obligations, the Intelligent Network Interface Device (INID) in one embodiment of this invention will manage, monitor and control network traffic at the service level (i.e., provide advanced traffic management and engineering services) while maintaining security of customer networks and the carrier Metropolitan Area Network (MAN).

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION

For the purposes of promoting an understanding of the principles of the invention, reference will now be made to the exemplary embodiments illustrated in the drawings, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Figure 1:
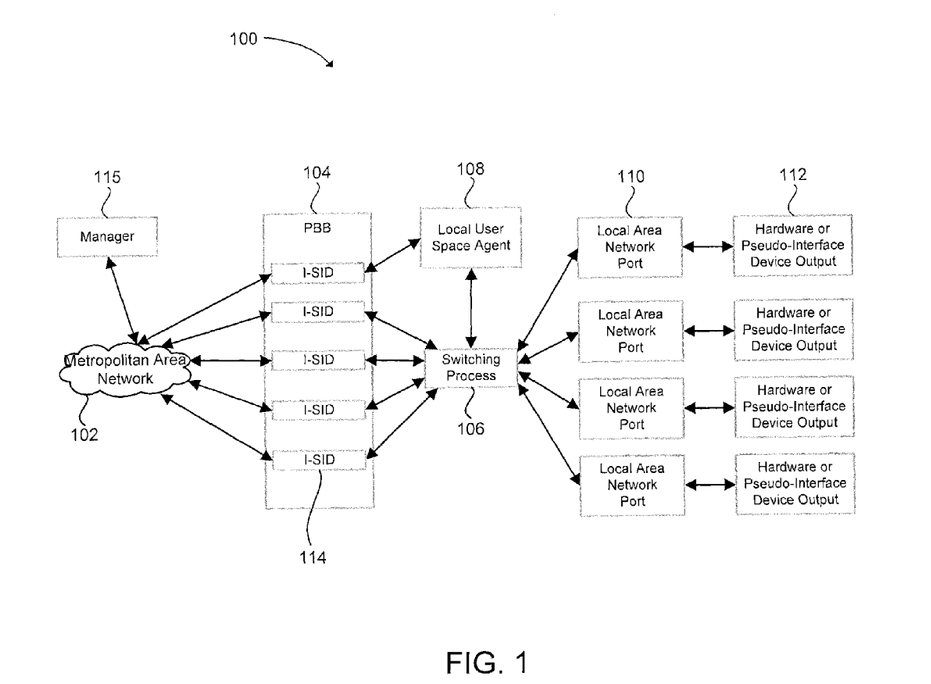
FIG. 1 illustrates a block diagram of a system to provide multiple private networks in accordance with an embodiment of the present invention.

A system and method are disclosed to provide multiple private networks 100, as illustrated in FIG. 1. The system can include a Provider Backbone Bridge (PBB) interface 104 configured to receive a plurality of data stream types from a Metropolitan Area Network (MAN) 102. The MAN may be used in transporting information from other networks or an information backbone, and the MAN can include a carrier Provider Backbone Bridge network. The PBB interface and network can also include a plurality of Instance Service Identifiers (I-SID) 114 through which information packets are received via the PBB interface. In one embodiment, an example of a Provider Backbone Bridge network includes a Provider Backbone Bridge Traffic Engineering (PBB/TE) interface.

Figure 5:
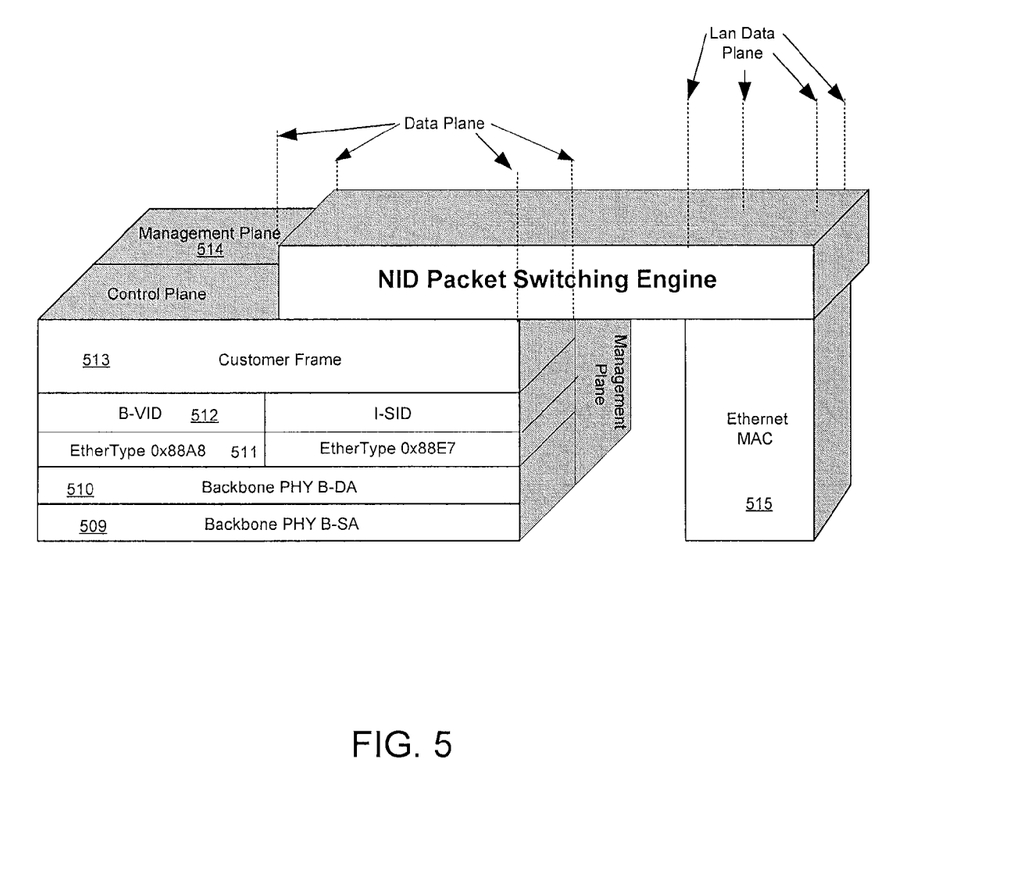
FIG. 5 is a perspective drawing of the layering in the network interface device and PBB layer.

PBB, as illustrated in FIG. 5, offers a complete separation of the customer 513 and the provider domains. A PBB trunk is defined by an additional frame header that can be decomposed to include several backbone components. The backbone components include the backbone source address (B-SA) 509; the backbone destination address (B-DA) 510; the Ethernet type 0x88A8 511; and the backbone Virtual Local Area Network identifier (B-VID) 512. The B-SA and B-DA identify the endpoints of the trunk. The B-VID is a backbone identifier used to distinguish different trunks to the same destination. The Ethernet type 0x88E7 511; and the I-SID is used to define the customer VLAN instances 513. A plurality of LAN ports 110, as illustrated in FIG. 1, can be configured to communicate data to a single or a plurality of LANs. The LAN ports can include hardware output devices 112 or pseudo-interface device outputs or wireless LAN outputs that can transmit signals out to one or a plurality of LANs. Each of the LAN ports can be separate Ethernet port. The hardware output devices can each be connected to or be a part of a separate LAN. A plurality of local devices can then each be connected to a plurality of separate LANs.

The term "local network port" can be defined as either a physical port, a logical software channel or channel endpoint in a communications system. In addition, the term port as used herein may also include the hardware output to provide the physical link layer for the logical software channel.

A switching process 106 can be provided between the PBB network and interface 104 and the LAN ports 110. The switching process can be configured to bind individual data stream types from the I-SIDs in the PBB to each of the respective LAN ports and to communicate packets between the PBB interface and the bound LAN ports. An individual data stream type that can be bound to a single Ethernet port may be an I-SID or a similar connection oriented protocol that can be used within the PBB network.

The individual data stream type may be bound to a single Ethernet port by QoS specified by contract with a customer. Each Ethernet port can connect to a plurality of LANs that will be Ethernet networks in one embodiment. While Ethernet is described herein, other types of LAN communication protocols could also be bound to individual I-SIDs.

The switching process 106 may register each LAN port by port or interface number and communicate through an operating system to each LAN port. The switching process can bind individual I-SIDs to Ethernet ports via simple Ethernet Bridging. The switching process can then switch packets from a Virtual Circuit (VC) to its bound Ethernet port.

By using the switching system to extend the switching protocol to the customer premises, transport carriers can apply virtual switching to the local loop and enable a connectionless IP infrastructure to support connection-oriented services. Providers can manage network traffic at the service level by classifying, mapping and aggregating ingress traffic into service and/or application level virtual connections. The customers or end users that have one or more LANs connected to the private network device or network interface device will be able to receive Ethernet encapsulation over PBB or a MAN.

The system for providing multiple private networks can include a local user space agent 108 that is a process configured to remotely manage or control settings and switching paths for the switching process 106. The user space control process can be in direct communication with the switching process to control the switching. There can be a remote manager 115 or management interface that is in communication with the local user space agent 108 for controlling the switching process 106. The remote manager may be a client application that is on an administrator's desktop or a web browser that can access the Network Interface Device (NID), implemented as the switching process 106, through the local user space agent 108. A simple network management protocol (SNMP) interface can also be part of the remote manager interface to manage the hardware and configuration items and aspects of the overall system and device.

The multiple private network device or NID can use 802.1Qay. 802.1Qay is used in an embodiment to transport Ethernet traffic over a PBB MAN by encapsulating it with an outer backbone MAC layer. When receiving information from the Ethernet physical connections, the NID will convert backbone Ethernet traffic to bridged customer Ethernet traffic by removing the backbone Ethernet MAC layer that includes the B-SA, B-DA, and B-VID. By using 802.1Qay, an embodiment of the invention can offer increased performance and flexibility. In addition, 802.1Qay eliminates the security risk by separating the outer backbone MAC used to transport the data from the inner MAC (consisting of encapsulated Ethernet and TCP/IP packet) used to provide the service. Applying the present system and method for transferring data is straight forward because the system can bind an I-SID to each Ethernet port.

Using this system and method, the multiple private network device or NID can bind together different interfaces, including customer Ethernet traffic as represented by I-SIDs to Ethernet interfaces. This embodiment of the invention does not typically need to incorporate details about higher level protocols, such as TPC/IP. In addition, the present system and method uses a separate Address Resolution Protocol (ARP) table or adjacency table for customer Ethernet traffic from the ARP or adjacency table used for outer Backbone Ethernet traffic.

An embodiment of voice traffic may use Voice over Internet Protocol (VoIP) and Analog Telephone Adapter (ATA). A common ATA is a device with at least one telephone jack (Foreign Exchange Subscriber (FXS) port) used to connect a conventional telephone and an Ethernet jack as an adapter to the LAN. Using such an ATA, it is possible to connect a conventional telephone to a remote VoIP switch. The ATA communicates with the remote VoIP switch using a VoIP protocol such as H.323, Session Initiation Protocol (SIP), Media Gateway Control Protocol (MGCP) or Inter-Asterisk eXchange protocol (IAX) and encodes and decodes the voice signal using a voice codec such as ulaw, alaw, Internet Low Bitrate Codec (ILBC) and others. Since ATAs communicate directly with a VoIP server, they do not require any software to be run on a personal computer, such as a Softphone. Another embodiment may provide VoIP with Real-time Transport Protocol (RTP) encapsulated using 802.1Qay.

With this system and method, video may also be provided using Internet Protocol TeleVision (IPTV) and a set top box. Information can also be output to a wireless network from the Ethernet output ports. The video or voice streams described can each be provided on their own separate LAN connection using a separate VC.

The input lines carrying the PBB protocol from the data services provider can use fiber optic lines, such as Gig Ethernet. The PBB data packet traffic may be carried over high bandwidth optical fiber.

The multiple private network device or NID is cost effective for operational expenditures, while increasing the number of services offered over a converged network. This system and method enables service providers to sell and/or market IP services (e.g., voice, video and data) rather than the underlying Ethernet transport service that the IP service may be carried on. The customer may receive I-SID based services but the services can be packaged as part of an overall IP service offering.

An added value for the transport provider is shifting from basic switching to managing the network as an intelligent information utility. This includes automating and simplifying service delivery software and providing an enhancing NID to bring the service provider closer to the customer.

This system and method can provide additional services. For example, customers are becoming more aware of their networking needs and how to meet those needs at the most cost effective levels. Customers want on-demand services and self provisioning, and they desire these features immediately. Customer friendly consolidated billing becomes even more important as the customer moves to a single bill for multiple services spanning a mix of fixed and usage-based tariffs.

Other specific protocols can be encompassed in this system and method. For example, there are advantages offered by the co-existence of PBB 802.1ad and PBB/TE 802.1Qay in enhancing existing networks and increasingly attention will be focused on these technology areas. Development in the underlying transmission layer will simply provide more cost effective and faster transport of raw information, and the value of this system and method is in the differentiating and optimizing services offered to the end customer.

Another benefit of the present system and method is the separation of the transport method from overlying services. While legacy carrier Ethernet based on VLAN-tagging and lack of separation between customer Ethernet traffic and backbone traffic is good for best effort services, it has disadvantages in scalability, failover reliability and QoS based Service Level Agreements (SLAs)

Security has recently become a more serious issue. One solution the present embodiments provide to this problem is to move the control plan out of band. In other words, the separate I-SIDs in 802.1Qay helps to separate and protect each network from easy IP intrusion. Because network granularity is increased, hackers will find it to be more difficult to access the resources they desire to exploit.

The other aspect of security is keeping critical services operating when using shared infrastructure. The service provider quite simply cannot have the Ethernet backbone network go down due to a problem with a particular customer's traffic.

Security is a primary consideration in any public switched network. The transport provider desires to ensure that different service providers on a common infrastructure cannot affect each other and that a denial-of-service (DoS) attack or other malicious actions cannot interfere with SLA compliance. The present system and method in one embodiment of this invention provides this desired level of security.

In addition with this system and method, the transport provider can offer network security as a value-added service, protecting service providers from security attacks. Using the NID described herein, the transport provider can provide protection from attacks such as ARP spoofing, Dynamic Host Control Protocol (DHCP) attacks, adjacency table poisoning and other threats.

The use of Ethernet alone in the last mile is used widely now. It brings tremendous flexibility, but the security with Ethernet in the last mile when implemented with legacy 802.1ad PBB networks without MAC separation between the customer's traffic and the backbone traffic, the transport provider's network is subject to the lower level of security associated with Ethernet. When VLAN tagging is used to differentiate among customers' traffic, any problem anywhere in the network can cause a disruption of the carrier's backbone. With Ethernet publicly available, hacker software and methods can be utilized by intruders to exploit standard Ethernet switch mechanisms without any expert knowledge, so the transport provider should choose a solution that includes support for many robust security features including the separation of address space. Therefore, since the NID of the present system and method is a point-to-point system, that uses PBB 802.1ad PBB provisioned point-to-point separate Ethernet connections, a higher level of security is provided.

Figure 2:
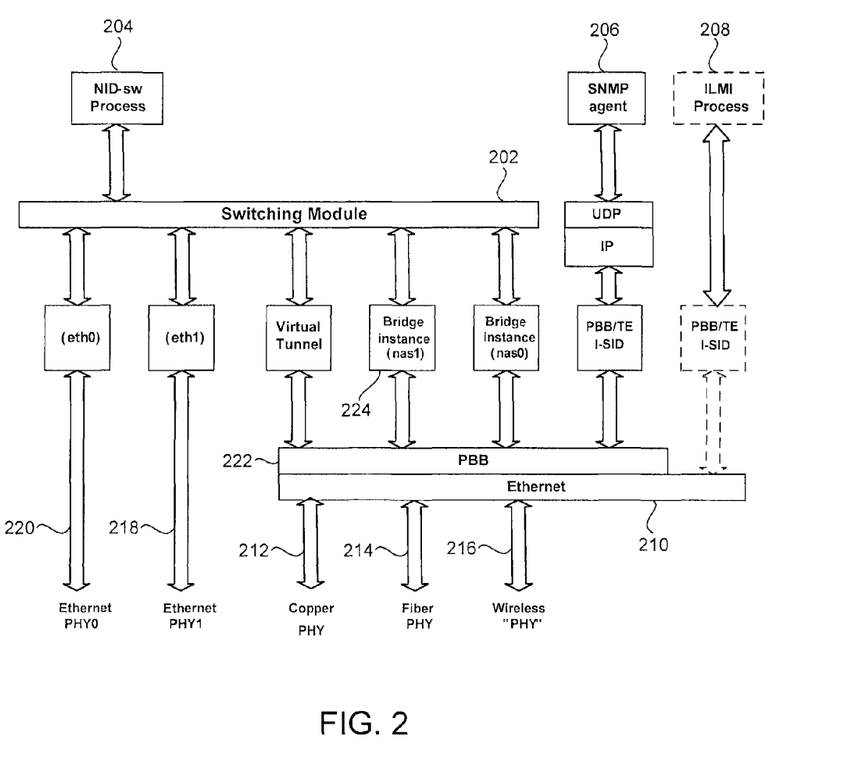
FIG. 2 illustrates an embodiment of a network interface device to provide multiple private networks in terms of the device's internal layers.

FIG. 2 illustrates an implementation of the private networks system or NID embodiment herein in terms of the device's internal layers. The device may be remotely managed by the carrier and can be configured to provide SLA grade service at a single point. The device provides access from the carrier's infrastructure to the user premises for all types of services including voice, data and video.

The NID is designed to be transparent to network traffic carried through the NID. The NID also provides provisioning tools to the carrier. The NID device can internally forward packets between PBB VCs provisioned for specific QoS to Ethernet LAN ports at the customer premises. The NID is designed to be physically located at the customer premises and provides a single point of interface to the carrier's network.

FIG. 2 illustrates a more detailed layered view of the networking device architecture. Each of the operating system network interfaces is shown at Packet Data Unit (PDU) level. Some of these interfaces are WAN interfaces and are layered over the PBB stack. Other network interfaces are LAN interfaces or "pseudo" or virtual interfaces.

The networking device includes a switching module 202 and an application process 204 (or NID-sw process) to control the switching module. The networking device also provides both a SNMP agent 206 for control of the device hardware and a web interface 208 for web based remote management of the PBB system Interim Local Management Interface (ILMI) process.

The networking device forwards incoming packets from a VC channel in the PBB protocol 222 from the WAN to one of several bound local Ethernet LAN interfaces 218, 220, etc. The NID can receive information from the WAN over a number of physical interfaces. For example, the physical interfaces can be copper 212, an optical fiber network 214, a wireless interface 216, or other physical channels that can transport PBB.

The NID forwards outgoing packets from each LAN's one or more Ethernet interfaces 218, 220 to their respectively bound VC channel(s) in the WAN interface. The NID switching system consists of a user space process controller and a packet switcher implemented as the switching module 202. The packet switcher can register an address family or socket type for the Ethernet port. The packet switcher communicates with the user space process controller through this socket.

Referring again to FIG. 2, the switching process 202 can bridge packets between any interface using an Ethernet like Media Access Control (MAC) layer and any VCs in the PBB layer. In one embodiment, the NID can operate in bridging mode 224. In switching mode, many types of Ethernet packet types can be transmitted including ARP, DHCP, Internet Protocol version 4 (IPv4), Internet Protocol version 6 (IPv6), 802.1 and other common types.

Figure 3:
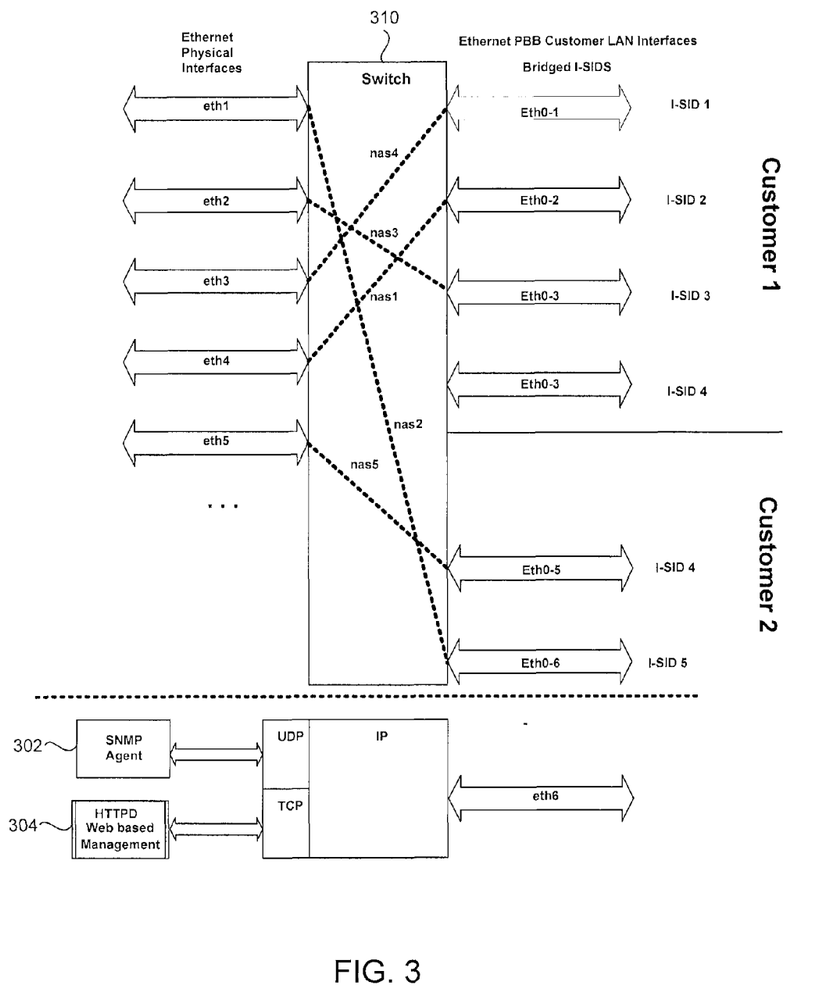
FIG. 3 is a block diagram illustrating switching between bridged I-SIDs received from the PBB interface and physical Ethernet interfaces in an embodiment of the invention.

FIG. 3 illustrates an embodiment of the system where the binding between Ethernet interfaces and Instance Service Identifiers (I-SIDs) is a one-to-one binding. However, the binding may be one I-SID to two or more Ethernet interfaces or vice-versa. In addition, the switching kernel module is a kernel module that can perform the frame forwarding at layer 2. The "nas-n" designation in FIG. 3 represents a virtual Ethernet interface that is a bridge instance that is being created in the NID.

The bottom part of FIG. 3 illustrates that some I-SID data streams are not switched but can be used to access the user interfaces for the device. The I-SID data streams can connect through an IP layer and then a User Datagram Protocol (UDP) layer to communicate with the SNMP agent 302. In a similar manner, an I-SID data stream can pass through a TCP/IP stack to control a Hyper Text Transfer Protocol (HTTP) web based management interface 304 for the networking device.

The NID switch module 310 supports any Ethernet-like interface. The NID may contain two or more types of network interfaces. One type of interface is called controlled interfaces or bridged interfaces. A second type of interface is uncontrolled. These interfaces allow IP traffic to proceed to layer 3 and are primarily for management traffic.

The NID switch module 310 or switch process is a program that can execute in user space. It receives requests from the SNMP agent and the web configuration process for provisioning of I-SID customer Ethernet interfaces and retrieving statistics. The switching module may be a NID switch process in one embodiment that contains the main control functions for the NID. The switching kernel module can control one or more switch or bridge interfaces, and provide a mechanism where bridges can be setup.

The present system and method provides LAN separation. Specifically, the NID can provide virtual separation between separate LANs even though the LANs are all multiplexed across a single WAN physical interface. Users on one network cannot access other networks because the traffic streams are being sent in separate I-SIDs. Virtual Local Area Network (VLAN) tags will be passed transparently to the customer equipment, the Ethernet Physical Interfaces, as shown in FIG. 3.

Protection is also provided against duplicate MAC addresses. While manufacturers of computer hardware generally try to generate unique MAC addresses, the uniqueness of MAC addresses is not guaranteed. When duplicate MAC addresses are visible on networks this can cause severe errors. Ethernet by itself does not have any check for duplicate addresses. Sometimes these errors may even occur between separate networks that are joined by a bridge or Virtual Local Area Network (VLAN) networking protocols.

This effective separation is achieved by separately switching packets between pairs of interfaces at layer 2 of the networking model based on ingress and egress logical interfaces. The NID can maintain many simultaneous logical bridges where each bridge is a member of a logical LAN. Ethernet MAC level duplications or MAC conflicts between LANs do not affect the traffic in another LAN and do not affect the traffic in the Provider Backbone Bridge (PBB.)

The effective separation achieved by the NID may be illustrated in another way. For example, data being transmitted using the PBB protocol includes a outer data packet or outer envelope with headers which includes the Backbone Source Address (B-SA) and the Backbone Destination Address (B-DA). The outer data packet or outer envelope also includes Backbone VLAN Identifier (B-VID) and I-SID data. This information, as discussed above, is used to direct the transmitted data to a desired LAN port. Specifically, the I-SID data is used to identify the desired LAN port.

In addition, the data being transmitted using the PBB protocol includes a inter data packet or inter envelope that includes the customer MAC addresses—source and destination, any control and payload data being transmitted to the desired port. The inter data packet or inter envelope is placed within or encapsulated in the outer data packet or outer envelope as the data is being transmitted on the MAN 102 and the PBB interface 104.

When the data including the outer data packet or outer envelope and the inter data packet or inter envelope is received at the PBB interface of the switch or NID 310, the outer data packet or outer envelope is stripped from the inter data package or inter envelope by the switch or NID 310. In other words, the inter data package or inter envelope is de-encapsulated from the outer data package or outer envelope.

The switch or NID 310 then uses the I-SID data in the outer data packet or outer envelope to create the binding with the LAN port or ports that are specified in the I-SID. For example, as shown in FIG. 3, the outer data packet or outer envelope includes the I-SID 1 will be used by the switch 310 to create a binding (nas4) with the Ethernet LAN port eth3. Thus, only the I-SID is used to create the binding between the PBB interface 104 and the LAN ports 110 through the switching process 106 or switch 310. Thus, the bindings are created independent of the B-SA, the B-DA, and the B-VID.

After the binding has been created, the inter data package or inter envelope that includes the customer Ethernet packet including the customer source and destination MAC addresses is sent to the bound LAN port(s) by the switch or NID 310. However, the switch or NID 310 does not alter in any way the customer Ethernet packet of the inter data package or inter envelope. That is, since the binding is generated using the I-SID as previously described, the switch or NID 310 does not even view the customer Ethernet frame format and therefore performs no direct action on the customer Ethernet packet.

This advantageously hides the customer MAC addresses from other LAN ports that are not part of the binding created between the PBB interface and the specific LAN port. In other words, from the point of the de-encapsulation of the inter data package or inter envelope from the outer data package or outer envelope, the other LAN ports cannot see the customer Ethernet packet that has been bound to the specific LAN port in the manner previously described. Further, since the I-SIDs, and not the customer MAC addresses, are used to by the switch or NID 310 to create the bindings, a false or duplicate MAC address provided to the switch or NID 310 by one customer will have no effect on the delivery of another customer's Ethernet packet. Accordingly, the binding to the specific LAN port(s) hides the customer MAC addresses as the other unbound LAN ports cannot see or access the customer MAC addresses.

In like manner, the binding created by the switch or NID 310 hides the customer MAC addresses of an Ethernet packet being sent from the bound LAN port to the PBB interface. That is, the binding hides the customer MAC addresses till the time the inter data packet or inter envelope that includes the customer MAC address and the Ethernet packet is encapsulated in the outer data packet or outer envelope at the PBB interface. Again, since the unbound LAN ports cannot see or access the customer MAC addresses, neither an unintentional or malicious use of a duplicate or false MAC address will affect the data being transmitted.

The processes described as part of this system and method can execute on any type of operating system. However, in one embodiment, Linux can be used to provide the desired environment for the present system and method.

FIG. 2 illustrates that the bridged instance 224 may be provided as part of the Linux PBB stack. This module is desirable because the NID switch module is configured to switch traffic between real Ethernet interfaces and interfaces which emulate Ethernet MACs.

Many types of wireless interfaces may be supported by the present system and method because wireless connections can emulate Ethernet MACs. There are some complexities with the 802.11 wireless interface types, but generally the specific configuration parameters can be provided to enable the appropriate communications.

The NID can be remotely managed, as discussed previously. At least three mechanisms can be provided for configuration and management. These access mechanisms can include secure shell access (SSH), SNMP, and web based management. Generally, the NID will be configured via SNMP or the Web interface. Most configuration options may be automatic. An administrator may perform functions such as checking on the status of all currently configured bridges by accessing the management interface.

The NID switch may receive power from the Telecommunication Company (Telco) or network service provider. This provides line power over the copper twisted pair from the Telco at the end user's location and avoids the need for batteries or local transformers. This means that copper will continue to exist for the last mile. If fiber is used to the customer's premises, then the connection from the remote terminal may include a hybrid fiber and copper. The fiber may be used for the communications and the copper for the power.

Figure 4:
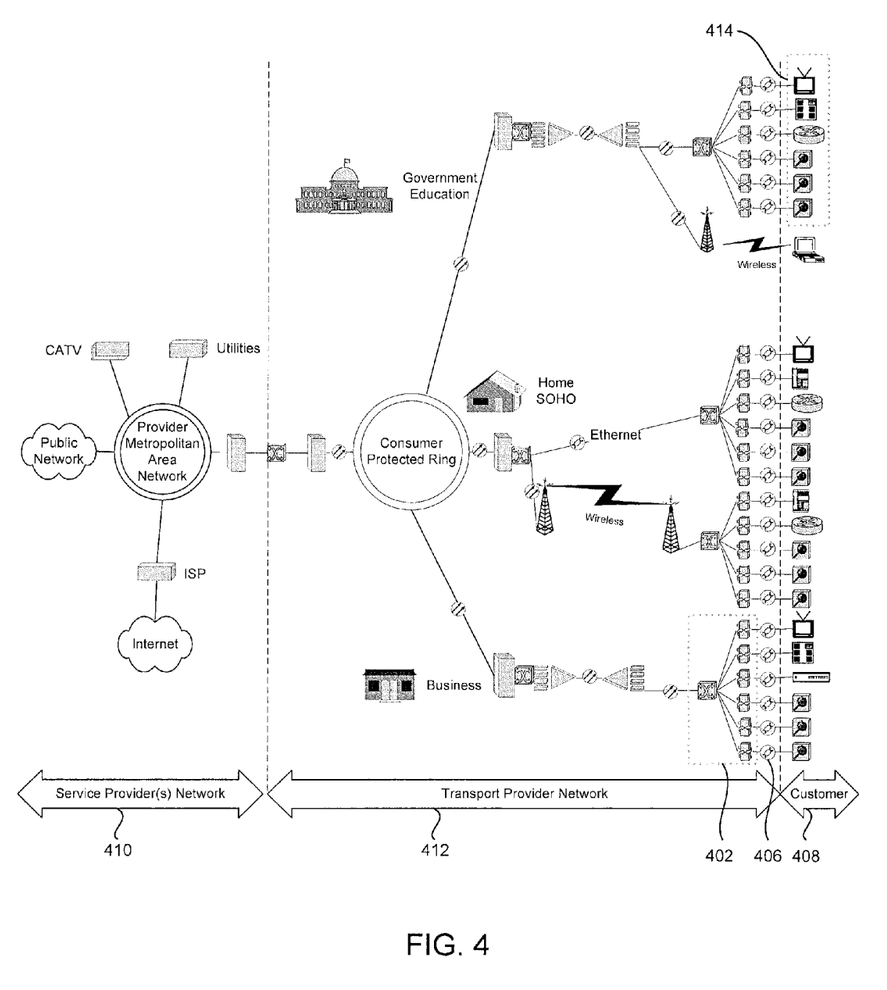
FIG. 4 is a block diagram illustrating a high level view of a logical organization for a broadband network in an embodiment of the invention.

FIG. 4 is a block diagram illustrating a high level view of a logical organization for a broadband network using an embodiment of the NID. In particular, the NID 402 of the present system and method is displayed as the interface between the transport provider's network 412 and the customer premises 408. The connection between the NID and the networks or devices at the customer premises can be a fiber pair 406.

The types of devices that may be on separate networks includes networked devices 414 such as cable TV, a VoIP line, a LAN, Smart Grid (e.g., water, gas, electric), a Private Branch eXchange (PBX), or other networked devices. This configuration allows the connected LANs and their end devices to communicate with entities or networks that are accessed through a service provider's network 410. For example, the connected LANs may communication with TV providers, utility providers, Internet Service Providers (ISP), voice networks, video networks or other service provider networks.

Figure 4A:
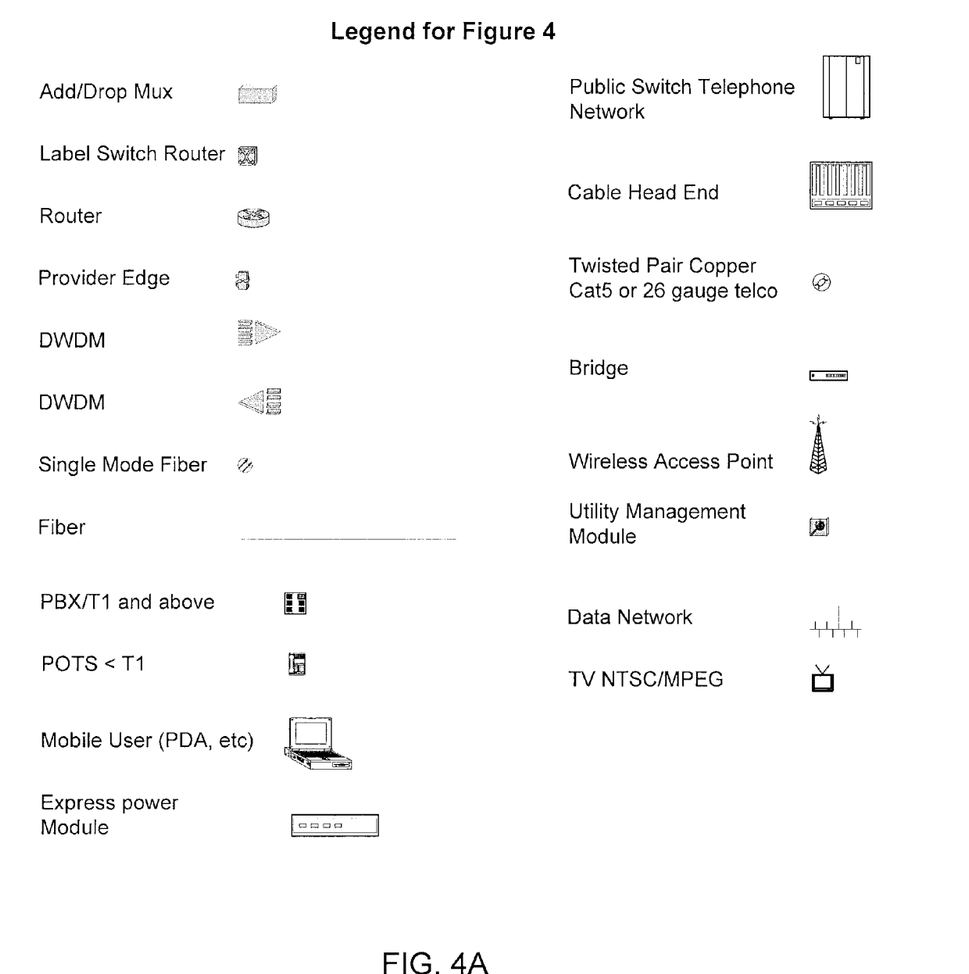
FIG. 4a is a legend illustrating the meaning of symbols in FIG. 4.

The configuration described allows service providers to create a separate network for each type of device or class of devices. For example, utilities can monitor the appropriate usage devices without requiring that a service person visit the usage meter. IPTV, voice services, video services, and Internet services can each have a separate protected network. Because each service is on its own network, each service is protected from processes and individuals who are accessing other networks. This division provides an increased level of security without dramatically increasing the amount of hardware that is needed at the customer premises. FIG. 4A is a legend for the devices illustrated in FIG. 4.

FIG. 5 is a perspective drawing of an embodiment of the network layering in the NID using the 802.1Qay Ethernet layering. In particular, a number of layers are shown for the switching and translation that takes place. The physical medium layer 502 is shown as a telecommunications connection that may be a high speed data connection. For example, the high-speed connection may be a wireless connection or another higher speed connection such as Gig Ethernet in one embodiment. A physical connection layer 504 can be used to network the physical media connections.

The 802.1Qay layer 509 is provided with VCs over which the Ethernet packets can be transported. The NID switch 516 receives the Ethernet packets associated with an I-SID through the described layers and then maps separate VCs to individual Ethernet ports 515. A management data layer or plane 514 is also provided for managing the NID switch.

Figure 6:
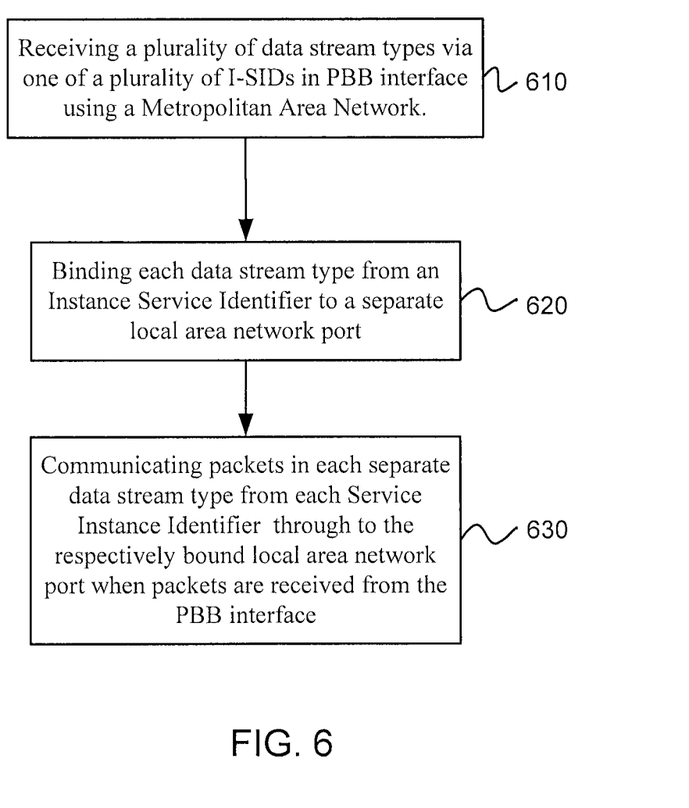
FIG. 6 is a flow chart illustrating a method to provide multiple private networks in accordance with an embodiment of the present invention.

FIG. 6 illustrates a method for interfacing with a network. The first operation is receiving a plurality of data stream types via one of a plurality of Instance Service Identifiers (I-SIDs) in a PBB interface using a metropolitan area network, as in block 610.

Each data stream type can be bound from an I-SID to a separate LAN port, as in block 620. Each data stream type can be bound to a physical Ethernet using simple Ethernet Bridging and 802.1Qay encapsulation for transport of Ethernet packets over the Provider Backbone Bridge.

The packets in each separate data stream type can be communicated from each Service Instance Identifier through to the respectively bound LAN port when packets are received from the PBB interface, as in block 630. Each data stream type can be transmitted through a respectively bound Ethernet port. The transmitting of the packets in each data stream type can be done by switching packets from the PBB interface to separately bound Ethernet ports using a switching process.

The switching process can also have user interface controls. The operation of controlling the switching process can be performed via a user space control process configured to control switching process settings. The user input for the control process can be received via a remote management interface in communication with the user space control process.

The present system and method provides a new breed of intelligent NIDs to establish improved management and engineering concepts and to enable transport carriers to deliver traditional, as well as packet-based, voice and tiered-data services from multiple service providers, over a single access network profitably. Using standards-based technology, these NIDs can create new revenue opportunities and reduce operational costs.

Specifically, the present NIDs can be designed to ensure that QoS objectives are satisfied for new and existing traffic flows and protect against congestion and degradation of network performance. The NIDs can monitor and control the latency, jitter, average and peak rate, and loss ratios to ensure that availability and performance is within acceptable or contracted service bounds, and that premium or priority services are given preferential treatment. To achieve this, the NID provides facilities for traffic classification, admission control, traffic shaping, and rate control. Classifiers within the NID can map network traffic requiring the same or similar QoS treatment to specific outbound queues.

Admission control services within the NID can ensure that the requested traffic profile and QoS levels be met concerning current network state, resource availability or other policy-based considerations prior to admitting the traffic flow. In addition, a variety of traffic-shaping and conditioning mechanisms can be employed to monitor and maintain compliance with traffic profiles or contracts. Finally, metering services may monitor and measure traffic against its profile and pass network traffic along to the appropriate policing mechanisms (e.g., the queuing and dropping services).

Once the NID has classified and groomed the service flows appropriately, traffic engineering services must be applied to aggregate and map them efficiently onto the existing network topology to control network behavior, optimize network resources and maximize traffic delivery performance.

In heterogeneous public networks, a provider backbone that separates customer traffic from backbone traffic such as PBB presents the best alternative for enabling NIDs to perform traffic engineering and manage QoS. Since this backbone Ethernet network operates independent of Internet protocols or customer Ethernet traffic, it becomes protocol-agnostic, and separates forwarding and control functions cleanly from service functions. The protocol supplies the intelligence required to associate a traffic stream with its type of service and processes the traffic stream according to the specified traffic contract or SLA.

This switching protocol gives NIDs the ability to associate and allocate any type of traffic with a particular service class. Each service class represents an aggregation of traffic that will be treated in the same manner as it traverses the network. These service classes are mapped to service policies that have been engineered to support specific SLAs (e.g., guaranteed bandwidth, low latency).

NIDs in the present system and method can create access networks that are feature-location agnostic by supporting both a physical and logical distribution of network intelligence. This virtualization of the access network enables carriers to deliver extremely scalable, efficient and secure private voice and data networks and transparently drive voice and unified communication features directly to the customer's doorstep. Intelligent NIDs reduce the complexity and operational costs associated with operating multiple networks for each service and provide a single network infrastructure that creates opportunities for bundling products, single billing, and developing new services that leverage voice, video and data services.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system to provide multiple private networks comprising:
   a public Metropolitan Ethernet Interface (MAN) consisting of a Provider Backbone Bridge (PBB) network configured to receive a plurality of customer network services each with a separate Service Instance Identifier (I-SID);
   a plurality of physically separate local area network (LAN) ports configured to communicate data to LAN ports; and
   a switching process between the PBB interface and the LAN ports; the switching process being configured to create bindings, wherein each binding binds an individual I-SID from the PBB interface to each of the respective LAN ports so as to communicate data packets between the PBB and the bound LAN ports, the data packets being assigned to an individual LAN port based on the I-SID data stream binding, wherein an Ethernet frame format of each data packet includes an Ethernet Media Access Control (MAC) address, wherein the bindings are created independent of the Ethernet frame format Backbone Source Address (B-SA), Backbone Destination Address, (B-DA) and Backbone VLAN Identifier (B-VID) and leave the Ethernet frame format unaltered, such that prior to encapsulation at the PBB interface of a data packet being transmitted from a specific LAN port to the PBB network via a specific binding and after de-encapsulation at the PBB interface of a data packet being transmitted from the packet switched network to the specific LAN port via the specific binding, the specific binding hides the MAC address of the Ethernet frame format of the data packet through that binding from other LAN ports;
   wherein the bindings between the PBB port and the LAN ports provide network security by hiding the MAC addresses such that a security breach using a duplicate MAC address on a LAN port does not affect operation of other LAN ports.

2. A system as in claim 1, wherein each LAN port is a physically separate Ethernet port.

3. A system as in claim 1, wherein the individual data stream that is bound to a single physically separate LAN port is a customer network service instance using a separate I-SID.

4. A system as in claim 1, wherein the individual data stream is bound to a physically separate LAN port by desired Quality of Service as represented by the Priority bits and other bits in the Instance I-SID and each LAN port is physically separate from and disconnected from all other LAN ports.

5. A system as in claim 1, further comprising a user space control process configured to control settings for bound LAN ports and switching paths used by the bound LAN ports.

6. A system as in claim 5, further comprising a remote management interface in communication with the user space control process.

7. A system as in claim 6, wherein the remote management interface includes a Simple Network Management Protocol (SNMP) interface and a web interface.

8. A system as in claim 1, wherein the PBB interface comprises a plurality of I-SID which is received from a Metropolitan Area Network (MAN) network.

9. A system as in claim 1, wherein the switching process registers each LAN by port number and communicates through an operating system to each LAN.

10. A system as in claim 1, wherein the LANs are Ethernet networks having no tags, headers, layers or fields between an Ethernet header and an IP header.

11. A system as in claim 1, wherein the MAN is PBB.

12. A system as in claim 1, wherein the switching process maps individual ISIDs to separate physical LAN ports using direct copying or bridging of Ethernet packets without adding any encapsulation or headers.

13. A system as in claim 1, wherein the LAN ports are virtual network interface devices.

14. A system as in claim 13, wherein the virtual network interface devices are wireless LAN ports.

15. A method for interfacing with a network, comprising:
   receiving a plurality of data streams via one of a plurality of Service Instance Identifiers (I-SIDs) in a Provider Backbone Bridge (PBB) interface;
   binding each data stream from an I-SID to a physically separate local area network (LAN) port;
   communicating data packets in each separate data stream associated with each I-SID through to the respectively bound LAN port when data packets are received from the PBB interface, wherein an Ethernet frame format of each data packet includes an Ethernet Media Access Control (MAC) address, wherein the bindings are created independent of the outer Ethernet frame format backbone MAC address including Backbone Source Address (B-SA), Backbone Destination Address (B-DA) and Backbone VLAN Identifier (B-VID) and leave the Ethernet frame format of the inner binding unaltered, such that prior to encapsulation at the PBB interface of a data packet being transmitted from a specific LAN port to the Metropolitan Ethernet Interface (MAN) via a specific binding and after de-encapsulation at the PBB interface of a data packet being transmitted from the MAN to the specific LAN port via the specific binding, the specific binding hides the MAC address of the Ethernet frame format of the data packet through that binding from other LAN ports; and wherein the bindings between the PBB interface and the physically separate LAN ports provide network security by hiding the MAC addresses such that a security breach using a duplicate MAC address on a LAN port cannot affect operation of other LAN ports.

16. A method as in claim 15, wherein communicating data packets further comprises transmitting each data stream through bound Ethernet ports.

17. A method as in claim 15, further comprising a step of switching data packets from the PBB interface to separately mapped Ethernet ports using a switching process.

18. A method as in claim 17, further comprising a step of controlling the switching process via a user space control process configured to control switching process settings.

19. A system as in claim 18, further comprising a step of receiving user input via a remote management interface in communication with the user space control process.

20. A system for interfacing between networks, comprising:
 a Provider Backbone Bridge (PBB) interface configured to receive a plurality of data stream via one of a plurality of Service Instance Identifiers (I-SIDs) over a Metropolitan Ethernet Interface (MAN);
 a plurality of physically separate Ethernet ports configured to communicate data to a local area network (LAN), wherein each LAN is differentiated by the physical LAN port;
 a switching process in communication with the PBB interface and the Ethernet ports, the switching process being configured to bind each of the I-SIDs to each of the separate Ethernet ports and to forward data packets between the PBB interface and bound Ethernet ports, wherein an Ethernet frame format of each data packet includes a Ethernet Media Access Control (MAC) address, wherein the bindings are created independent of the Ethernet frame format MAC address and leave the Ethernet frame format unaltered, such that prior to encapsulation at the PBB interface of a data packet being transmitted from a specific LAN port to the MAN via a specific binding and after de-encapsulation at the PBB interface of a data packet being transmitted from the MAN to the specific LAN port via the specific binding, the specific binding hides the MAC address of the Ethernet frame format of the data packet through that binding from other LAN ports; and wherein the bindings between the I-SIDs and the Ethernet ports provide network security by hiding the MAC addresses such that a security breach using a duplicate MAC address on an Ethernet port cannot affect operation of other Ethernet ports.

21. A system as in claim 20, wherein the switching process binds individual I-SIDs to individual Ethernet ports using only bridging without additional encapsulation or alteration of Ethernet frames.

22. A system as in claim 20 further comprising a user space control process configured to control settings and input for the switching process.

23. A system as in claim 22, further comprising a remote management interface in communication with the user space control process.

24. A system as in claim 20, wherein data packets sent from the LAN ports through the PBB interface are encapsulated with the Backbone Tag consisting of Backbone Destination Address (B-DA), Backbone Source Address (B-SA) and Backbone VLAN tag (B-VID) as required by interfacing backbone bridges in the MAN network.

25. A system as in claim 24, wherein data packets received from a plurality of I-SIDs in a PBB interface are de-encapsulated from the B-DA, B-SA and B-VID before mapping to a bound LAN port.

26. A system as in claim 20, wherein each binding of a separate customer network I-SID to a bound LAN port is physically separate such that it is protected from poisoning or other attacks of ARP or adjacency table poisoning used for each of a plurality of other LANs.

27. A system as in claim 20, wherein each binding of a separate customer network I-SID to a bound LAN port is separate from the PBB such that the PBB interface will be protected by a poisoning or attack of the ARP or adjacency table for a plurality of bindings between I-SIDs and LAN ports.

* * * * *